(12) United States Patent
Hirakoso

(10) Patent No.: US 7,428,346 B2
(45) Date of Patent: Sep. 23, 2008

(54) IMAGE PROCESSING METHOD AND IMAGE PROCESSING DEVICE

(75) Inventor: Hiroto Hirakoso, Tokyo (JP)

(73) Assignee: Sony Corporation (JP)

( * ) Notice: Subject to any disclaimer, the term of this patent is extended or adjusted under 35 U.S.C. 154(b) by 1059 days.

(21) Appl. No.: 09/955,196

(22) Filed: Sep. 19, 2001

(65) Prior Publication Data

US 2002/0146180 A1    Oct. 10, 2002

(30) Foreign Application Priority Data

Sep. 21, 2000    (JP)    ............................ P2000-287320

(51) Int. Cl.
G06K 9/32    (2006.01)
(52) U.S. Cl. ...................................... 382/300
(58) Field of Classification Search ......... 382/260–265, 382/298–300, 279
See application file for complete search history.

(56) References Cited

U.S. PATENT DOCUMENTS 5,517,584 A * 5/1996 Jennings ..................... 382/276
6,263,120 B1 * 7/2001 Matsuoka .................... 382/300
6,510,254 B1 * 1/2003 Nakami et al. .............. 382/300
6,704,463 B1 * 3/2004 Okada et al. ................ 382/300
6,707,467 B1 * 3/2004 Suga .......................... 345/698

OTHER PUBLICATIONS

European Search Report and Annex dated Mar. 1, 2004.
"Piecewise Polynomial Kernels for Image Interpolation: A Generalization of Cubic Convolution", Meijering, et al, pp. 647-651 IEEE 1999.
"Asymmetric Interpolation Lattice", Yuan, IEEE Transactions on Signal Processing, vol. 44, No. 5, May 1, 1996.

* cited by examiner

Primary Examiner—Matthew C. Bella
Assistant Examiner—Wesley Tucker
(74) Attorney, Agent, or Firm—Rader Fishman & Grauer PLLC; Ronald P. Kananen

(57) ABSTRACT

In order to enlarge or reduce a digital image, the interpolation signals between discrete original pixels used to calculate output pixel values are calculated by an FIR digital filter using as an interpolating function a function obtained by composing a function based on a cubic convolution method and a function based on a bilinear method.

21 Claims, 11 Drawing Sheets

OUTPUT IMAGE WHEN ENLARGED (x 2 TIMES)

OUTPUT IMAGE WHEN ENLARGED (x 3/4 TIMES)

INTERPOLATING FUNCTION BASED
ON BI-LINEAR METHOD

SAMPLING
POINT

INTERPOLATING FUNCTION BASED
ON CUBIC CONVOLUTION METHOD

SAMPLING
POINT

INTERPOLATING FUNCTION (1)

INTERPOLATING FUNCTION (2)

CONVOLUTION IN BI-LINEAR
INTERPOLATING METHOD

FIR FILTER OF BI-LINEAR POLATING METHOD

CONVOLUTION IN CUBIC CONVOLUTION
INTERPOLATING METHOD

FIR FILTER OF CUBIC CONVOLUTION
INTERPOLATING METHOD

IMPULSE
TRAIN

RESPONSE OF INTERPOLATING FUNCTION
BASED ON BI-LINEAR METHOD

RESPONSE OF INTERPOLATING FUNCTION
BASED ON CUBIC CONVOLUTION METHOD

RESPONSE OF INTERPOLATING FUNCTION (1)

RESPONSE OF INTERPOLATING FUNCTION (2)

IMAGE PROCESSING METHOD AND IMAGE PROCESSING DEVICE

BACKGROUND OF THE INVENTION

1. Field of the Invention

The present invention relates to a technique which enables an operation amount or a circuit scale to be reduced when processing of enlarging or reducing a digital image is carried out.

2. Description of the Related Art

Recently, digital type image pickup devices, for example, a video camera, and a still picture video camera have rapidly propagated. Accordingly, a signal processing technique containing a video signal is also shifted from analog to digital, and images to be processed have been changed from analog images recorded on silver chloride films to digital images recorded in various types of digital recording media.

In a case where analog images and digital images as described above are enlarged or reduced, the processing based on an analog means using an optical system or the like is carried out in the former case. However, in the latter case, it is necessary to determine image constituent pixel values through operations to carry out the digital processing.

That is, as shown in FIG. 3, an interpolation continuous signal obtained by arranging interpolation signals restored through an interpolation operation between discrete signals constituting an original image is enlarged by re-sampling the image data at smaller intervals than the original image when the image is enlarged, and also reduced by re-sampling the image data at larger intervals than the original image when the image is reduced. In the above interpolating operation, the interpolation using the sinc function based on the sampling theorem is the basic concept.

In the conventional interpolating operation is proposed an interpolating method of using an approximate expression of the sinc function as an interpolating function for convolution in order to reduce the operation amount. As such an interpolating method are known a nearest neighbor method, a bilinear method, a cubic convolution method, etc.

The operation based on the convolution is implemented by a so-called FIR digital filter. The image quality of an enlarged or reduced image obtained by the nearest neighbor method, the bilinear method or the cubic convolution method is enhanced more and more in this order, however, the order of the interpolating function and the number of taps of a filter are increased more and more in this order.

Accordingly, when the operation based on each interpolating operation method is implemented by software, the operation amount is increased in the above order, that is, in the order of enhancing the image quality, so that there is a problem that the load imposed on an operating unit such as CPU is increased and thus the processing time is long. Further, when the operation is carried out by hardware, there is a problem that the circuit scale is likewise increased.

SUMMARY OF THE INVENTION

The present invention has been implemented in view of the foregoing problems, and has an object to reduce the operation amount with keeping high image quality in the image processing of enlarging or reducing a digital image.

In order to attain the above object, according to the present invention, there are provided an image processing method and an image processing device in which in order to enlarge or reduce a digital image, interpolation signals between discrete original pixels used to calculate output pixel values are calculated by an FIR digital filter using as an interpolation function a function obtained by composing a function based on a cubic convolution method and a function based on a bilinear method.

Accordingly, a converted image having high image quality can be achieved in spite of a simple interpolation-signal calculating operation and a short processing time.

DETAILED DESCRIPTION OF THE PREFERRED EMBODIMENTS

Preferred embodiments of an image processing method and an image processing device according to the present invention will be described below with reference to the accompanying drawings.

In the embodiments described below, the present invention is applied to an image processing device for carrying out image processing by software or hardware.

Briefly describing the principle of the present invention, an image processing method and an image processing device for enlarging or reducing a digital image are characterized in that interpolation signals between discrete original pixels used to calculate output pixel values are calculated by an FIR digital filter using as interpolating function a right-and-left asymmetrical interpolating function obtained by composing a part of a function based on a cubic convolution method and a part of a function based on a bilinear method.

First, the construction of the image processing device according to the present invention will be described.

Figure 1:
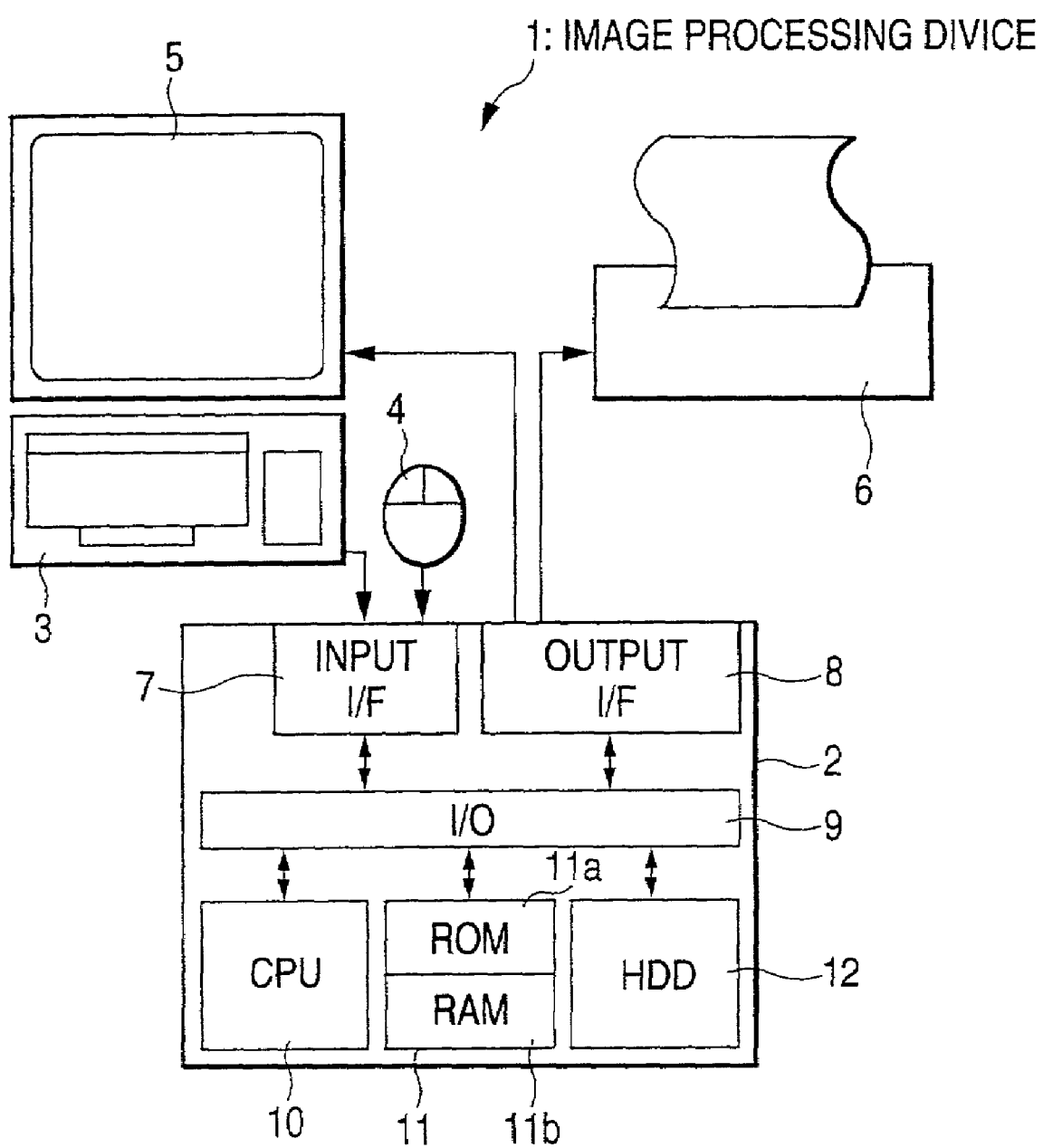
FIG. 1 is a diagram schematically showing the construction of an example of an image processing device for performing image processing by software in an embodiment of the present invention.

FIG. 1 shows an image processing device 1 for carrying out image processing by software, and the image processing device 1 is a computer called as PC/WS.

The image processing device 1 comprises a main body portion 2, a keyboard 3 connected to the main body portion 2, a mouse 4, a monitor 5, a printer 6, etc. In the main body portion 2 are installed an input I/F (interface) 7, an output I/F (interface) 8, an I/O (input/output) bus 9, a CPU (central processing unit) 10, a built-in memory 11 comprising ROM (read only memory) 11a and RAM (random access memory) 11b, HDD (hard disc drive) 12, etc.

The respective parts of the image processing device 1, that is, the keyboard 3 and the mouse 4 are connected to the input I/F 7 of the main body portion 2, and the monitor 5 and the printer 6 are connected to the output I/F 8 thereof. In the main body portion 2, the input I/F 7, the output I/F 8, CPU 10, the built-in memory 11 and HDD 12 are connected to the I/O bus 9, and these parts mutually exchange data through the I/O bus 9.

In the image processing device 1 having the construction as described above, the data of a digital original image as a target to be enlarged or reduced are stored in HDD 12 serving as a secondary storage device. The data of the digital original image are developed in RAM 11b serving as a primary storage device through the I/O bus 9, and an enlarging or reducing operation using the image processing method of the present invention described later is carried out by CPU 10.

The digital image that has been enlarged or reduced as the above operation result is output through the I/O bus 9 and the output I/F 8 to the output device such as the monitor 5, or the printer 6.

The program of implementing such image enlarging or reducing processing is stored in HDD 12, and it is developed in RAM 11b and executed by CPU 10 as occasion demands. Further, a user operates the image processing device 1 by using the keyboard 3 or the mouse 4 serving as a standard input device.

Figure 2:
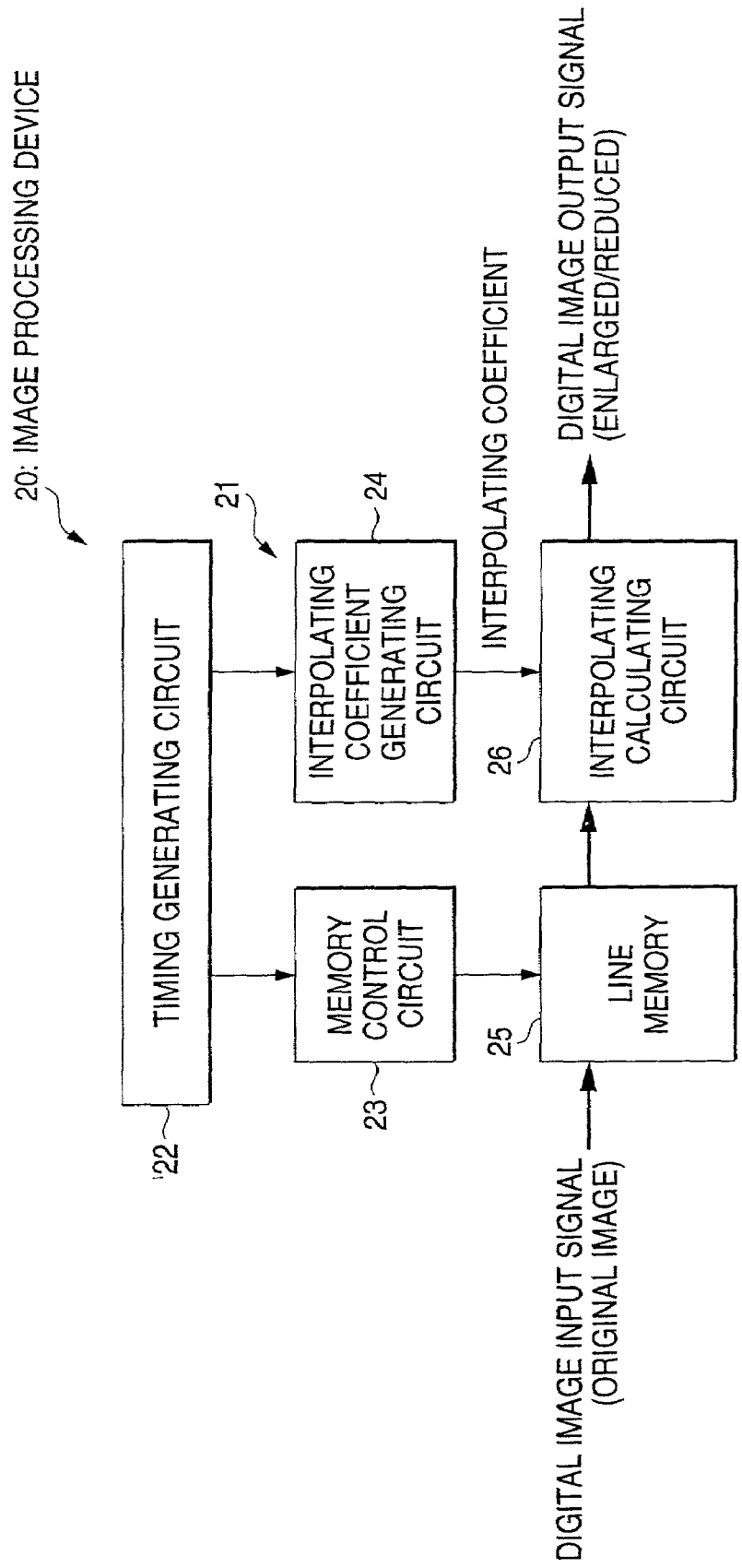
FIG. 2 is a block diagram schematically showing the construction of the main part of an example of an image processing device for performing image processing by hardware in the embodiment of the present invention.

FIG. 2 is a block diagram showing an enlarging/reducing circuit of digital image data (hereinafter referred to as an image processing circuit) 21 in the image processing device 20 which is designed to execute image processing by hardware. The image processing circuit 21 described above is located at the final stage of the signal processing system of a CCD digital camera, for example, and it serves to input as an original image signal a signal that is established as a digital image because all the signal processing on the signal has been completed.

That is, the processing circuit 21 comprises a timing generating circuit 22, a memory control circuit 23, an interpolating coefficient generating circuit 24, a line memory 25 and an interpolating calculation circuit 26.

The original image signal is written in the line memory 25 serving as a delay line when the interpolating calculation is carried out. Proper pixel data are read out from the line memory in accordance with any enlarging or reducing rate, and input to the interpolating calculation circuit 26. The write-in and read-out addresses into/from the line memory 25 are generated by the memory control circuit 23.

In the interpolating calculation circuit 26, the target pixel data thus input are operated by using the image processing method of the present invention described later according to the interpolating coefficient generated in conformity with the enlarging rate or reducing rate of the image in the interpolating coefficient generating circuit 24, and output as an enlarged or reduced digital video signal. The memory control circuit 23 and the interpolating coefficient generating circuit 24 are controlled to be synchronized with each other by the timing generating circuit 22.

Next, the image processing method of the present invention will be described.

Figure 3:
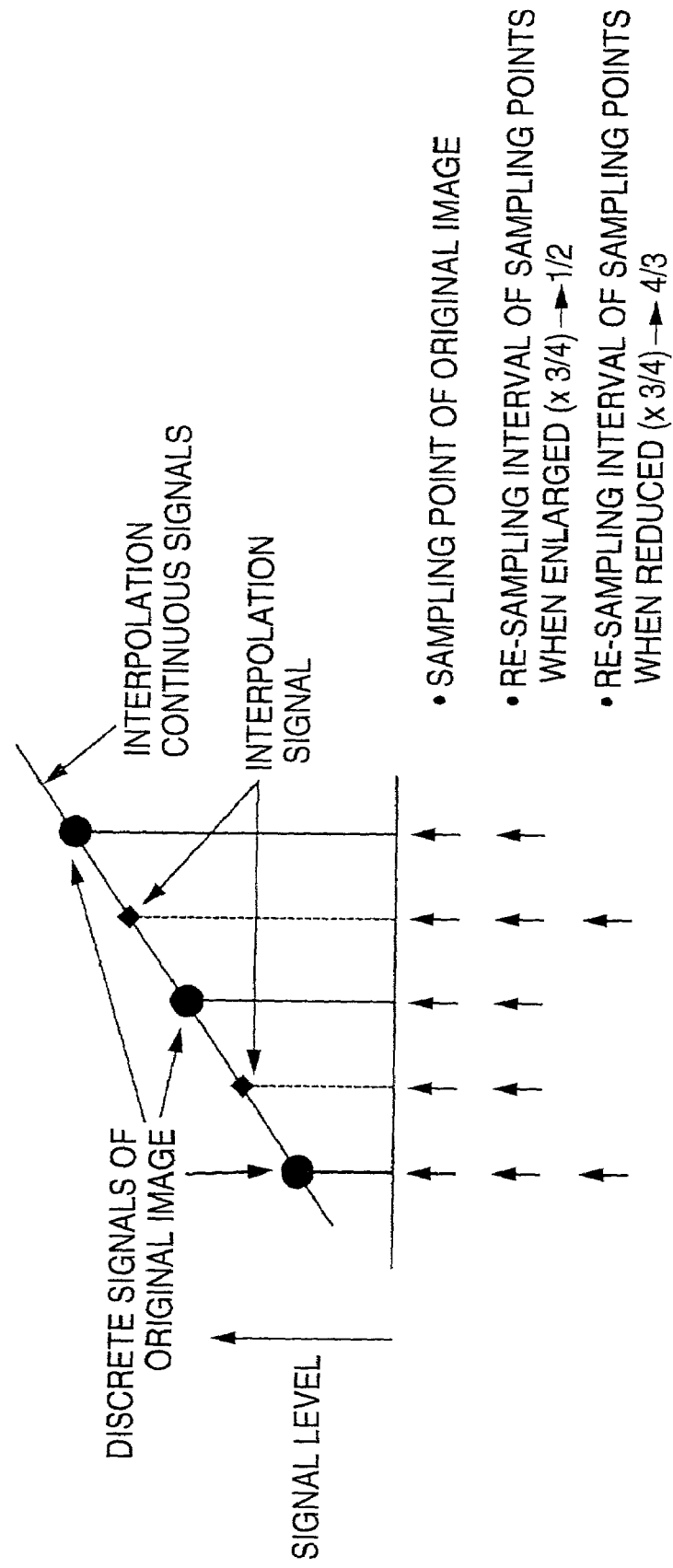
FIG. 3 is a diagram schematically showing a method of achieving interpolation signals from an input original image and carrying out re-sampling.
Figure 4:
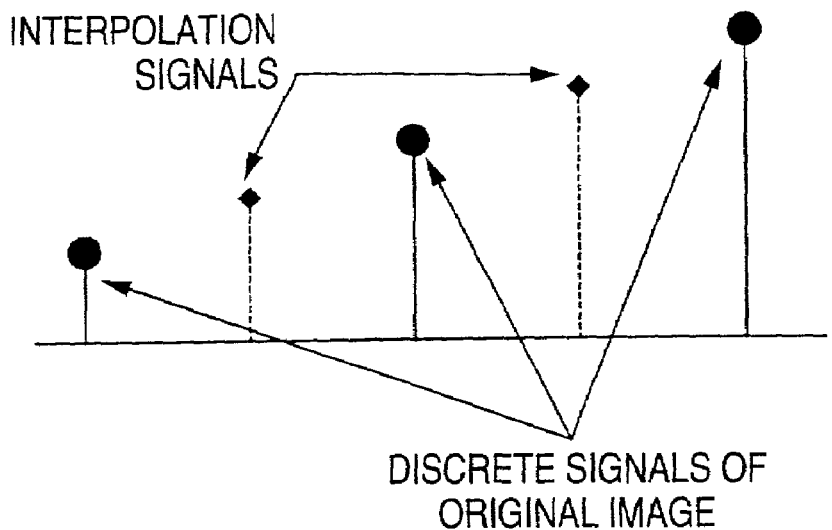
FIG. 4 is a diagram schematically showing the behavior of video signals that have been processed to be enlarged twice.
Figure 5:
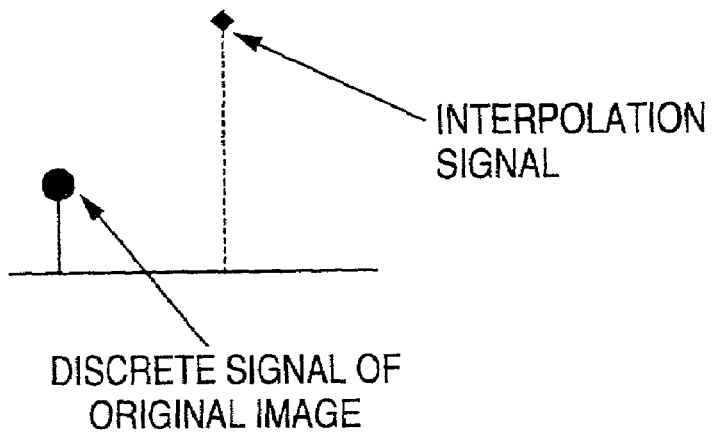
FIG. 5 is a diagram schematically showing the behavior of video signals that have been processed to be reduced to ¾.

According to the digital image enlarging or reducing processing, as shown in FIGS. 3 to 5, the gaps between discrete signals constituting the original image are embedded with interpolation signals that are restoratively created by the interpolating calculation. When the enlarging operation is carried out, the discrete signals of the original image and the interpolation signals are re-sampled at intervals smaller than the original image, and conversely when the reducing operation is carried out, these signals are re-sampled at intervals larger than the original image.

In the interpolating calculation for achieving the interpolation signals, the interpolation using the sinc function based on the sampling theorem is the basic concept. The sinc function is represented by the following equation 1.

$$\text{sinc function} = \sin(x)/x \quad (-\infty \leq x \leq +\infty) \qquad \text{[Equation 1]}$$

A method of using an approximate equation of sinc function as an interpolating function for convolution has been proposed for the conventional interpolation calculation in order to reduce the load of the interpolating calculation. As representative ones have been known the following three methods described in the column of the Prior Art.

A first method is a nearest neighbor method using interpolated pixel values as the nearest neighbor pixel values. In this method, representing an interpolating function by a graph, the function has a rectangular shape as omitted from the illustration. An interpolating function h(x) based on the nearest neighbor method is shown in the following equation 2.

$$h(x) = \begin{cases} 1 & (0 \leq |x| \leq 0.5) \\ 0 & (0.5 \leq |x|) \end{cases} \qquad \text{[Equation 2]}$$

Figure 6:
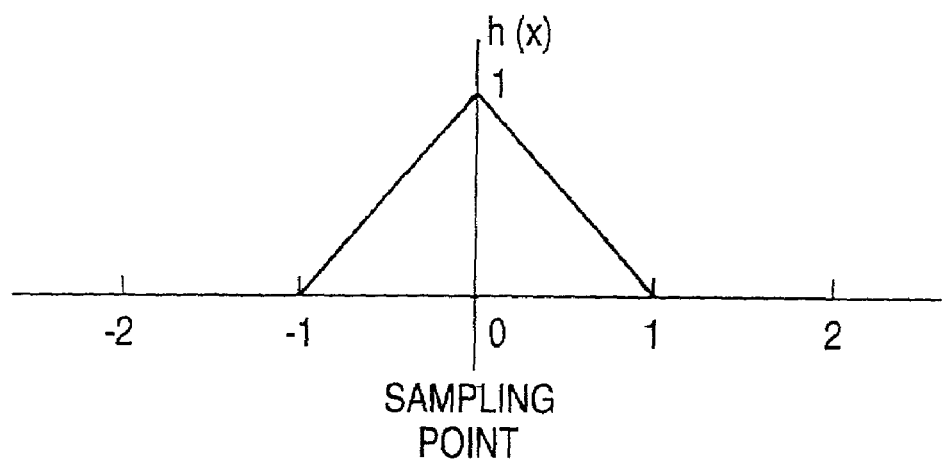
FIG. 6 is a graph showing the characteristic of interpolating function in a bilinear interpolating method.

A second bilinear method is to calculate an interpolated pixel value by subjecting two neighboring pixels thereof to linear interpolation. The interpolating function thereof is called as a triangle function, and it is represented by a graph as shown in FIG. 6. The interpolating function h(x) in the bilinear method is shown in the following equation 3.

$$h(x) = \begin{cases} 1 - |x| & (0 \leq |x| < 1) \\ 0 & (1 \leq |x|) \end{cases} \quad \text{[Equation 3]}$$

Figure 7:
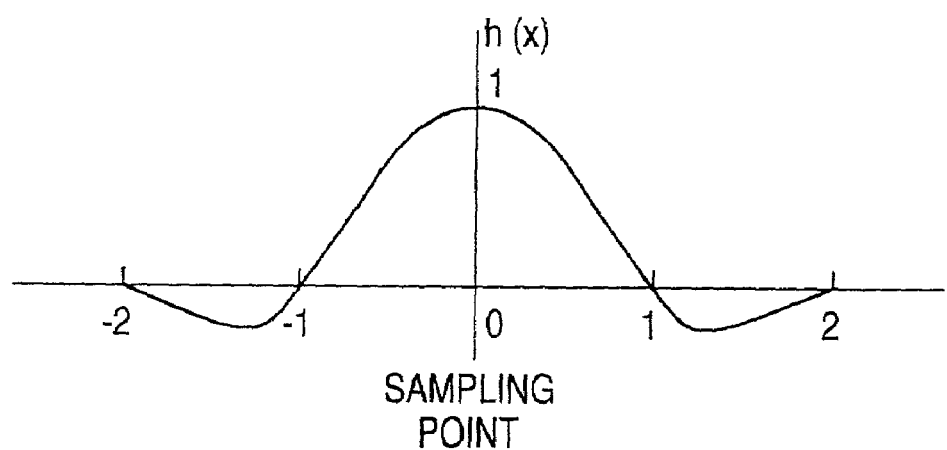
FIG. 7 is a graph showing the characteristic of interpolating function of a cubic convolution interpolating method.

A third cubic convolution method is a method of calculating an interpolated pixel value by convoluting a finite-range (−2<x<+2) approximate equation of the sinc function as an interpolating function into four pixel values that are neighboring to the interpolated pixel value. The interpolating function in this method is represented by a graph as shown in FIG. 7. The interpolating function h(x) in the cubic convolution method is shown in the following equation 4.

$$h(x) = \begin{cases} |x|^3 - 2|x|^2 + 1 & (0 \leq |x| < 1) \\ -|x|^3 + 5|x|^2 - 8|x| + 4 & (1 \leq |x| < 2) \\ 0 & (2 \leq |x|) \end{cases} \quad \text{[Equation 4]}$$

The image quality of output images achieved by the above three interpolating methods will be compared. In an image achieved by the nearest/neighbor method, the interpolated pixels are stepwise quickly varied in accordance with the values of the original pixels and thus the image looks mosaic. On the other hand, in an image achieved by the bilinear method, it is impressed as if it looks smooth because the interpolated pixels are achieved by the linear approximation of original pixels. Further, in an image achieved by the cubic convolution method, as it is obvious from the shape of the interpolating function shown in FIG. 7, it has a high frequency-band emphasis type response characteristic, so that the edge of the image is sharp and an excellent result providing a clear impression is achieved.

Figure 10:
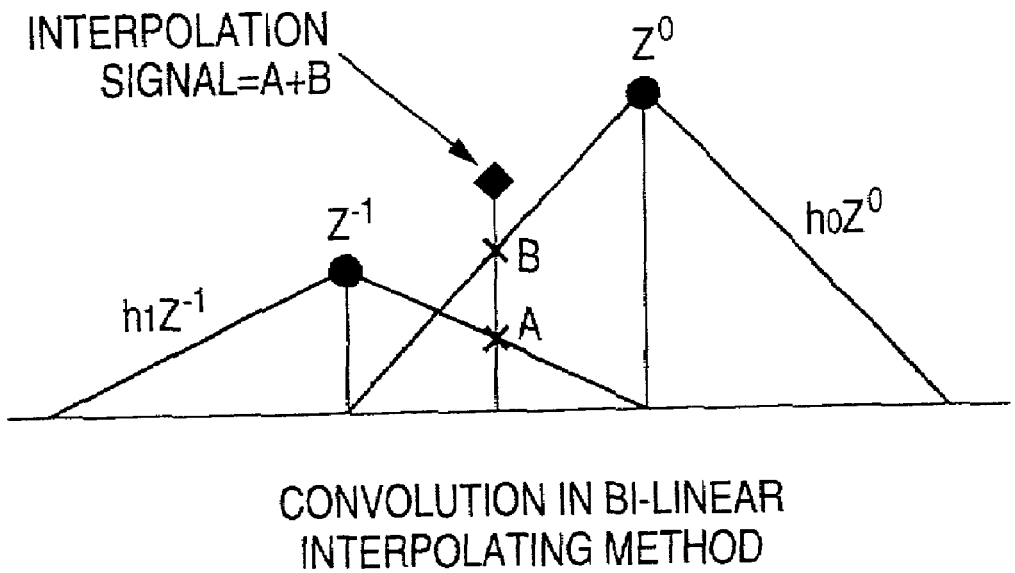
FIG. 10 is a diagram showing the principle of the calculation method based on convolution in the bilinear method.
Figure 11:
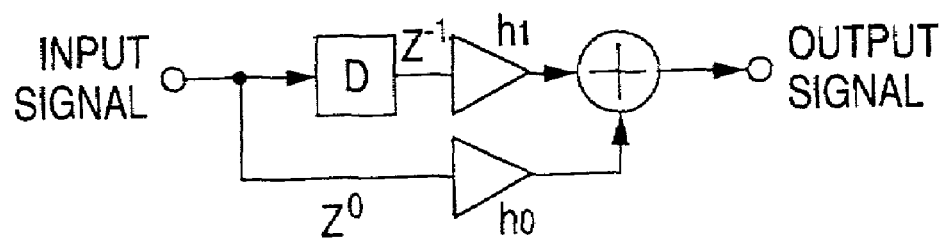
FIG. 11 is a diagram showing an FIR digital filter in the bilinear method.
Figure 12:
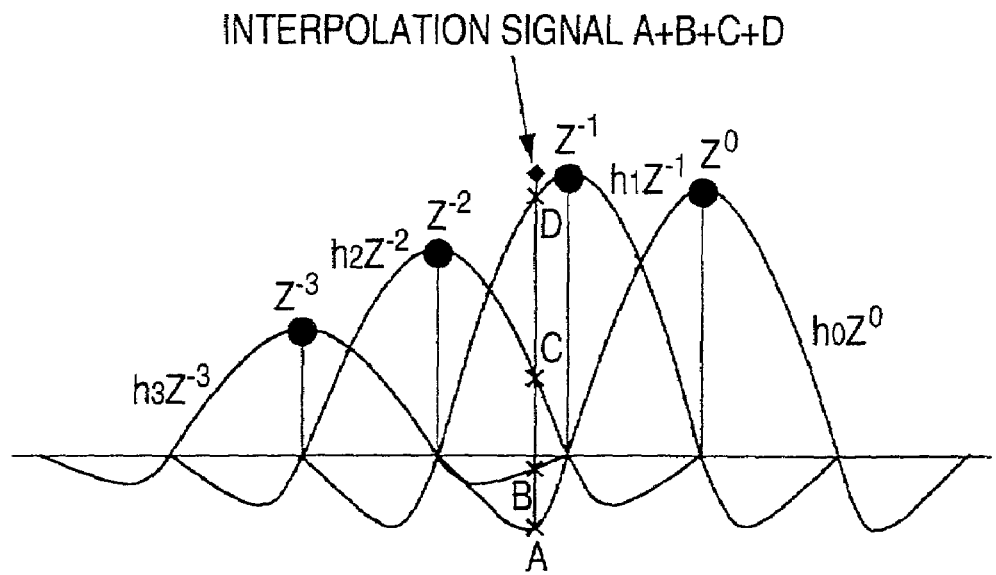
FIG. 12 is a diagram showing the principle of the calculation method based on the convolution in a cubic convolution interpolating method.
Figure 13:
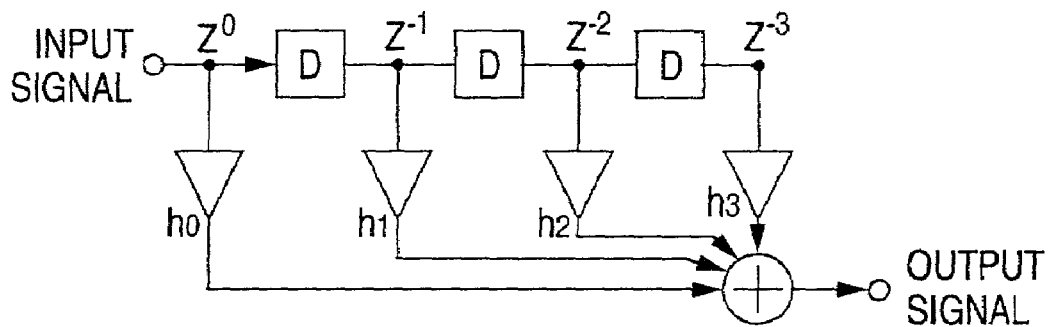
FIG. 13 is a diagram showing an FIR digital filter in the cubic convolution interpolating method.

However, with the cubic convolution method, as is apparent from the comparison between the equation 3 and the equation 4, the calculation of the interpolating function is more complicate than the bilinear method. Further, in the bilinear method, an interpolation pixel is determined by the calculation using adjacent two points ($(Z^0, Z^{-1})$ (interpolation signal=A+B) as shown in the graph of FIG. 10. On the other hand, in the cubic convolution method, the calculation of the interpolation pixel needs the pixels of adjacent four points ($Z^0$, $Z^{-1}$, $Z^{-2}$, $Z^{-3}$) (interpolation signal=A+B+C+D) as shown in the graph of FIG. 12. This is because the degree to create an FIR digital filter (interpolating filter) for convolution of the interpolating function is equal to the first order for the former, but the third order for the latter as shown in FIGS. 11 and 13.

In general, as the degree of the interpolating filter is increased, the performance of the filter is enhanced. However, the calculation amount is increased and thus the processing time is long.

That is, as described above, if the interpolating function is complicated to be close to the sinc function and the degree of the interpolating filter is increased, the interpolating performance would be enhanced and the image quality would be also enhanced. However, there is a problem that when the image processing is carried out by software, the calculation time is increased, and when it is carried out by hardware, the scale of the calculating circuit is rapidly increased.

Accordingly, in the image processing method of the present invention, in consideration of the trade-off, the degree of the interpolating filter is lowered as compared with the cubic convolution method, and there is implemented an interpolating filter having a high frequency-band emphasis type characteristic which is not obtained by the bilinear method. That is-, specifically, a function obtained by composing a tertiary function of the cubic convolution method and a triangle function of the bilinear method is used as an interpolating function used to restore inter-discrete-image signals.

The interpolating function h(x) of the present invention is shown in the following equations 5 and 6.

$$(1) \quad h(x) = \begin{cases} 0 & (x < -1) \\ x + 1 & (-1 \leq x < 0) \\ x^3 - 2x^2 + 1 & (0 \leq x < 1) \\ -x^3 + 5x^2 - 8x + 4 & (1 \leq x < 2) \\ 0 & (2 \leq x) \end{cases} \quad \text{[Equation 5]}$$

$$(2) \quad h(x) = \begin{cases} 0 & (x \leq -2) \\ x^3 + 5x^2 + 8x + 4 & (-2 < x \leq -1) \\ -x^3 + 2x^2 + 1 & (-1 < x \leq 0) \\ 1 - x & (0 < x \leq 1) \\ 0 & (1 < x) \end{cases}$$

Figure 8:
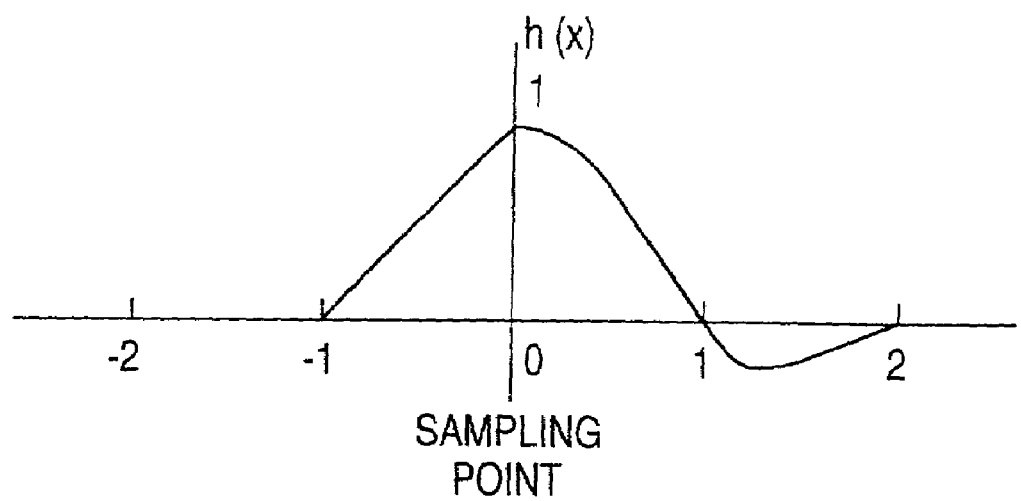
FIG. 8 is a graph showing the characteristic of an example of an interpolating function of the embodiment of the present invention.
Figure 9:
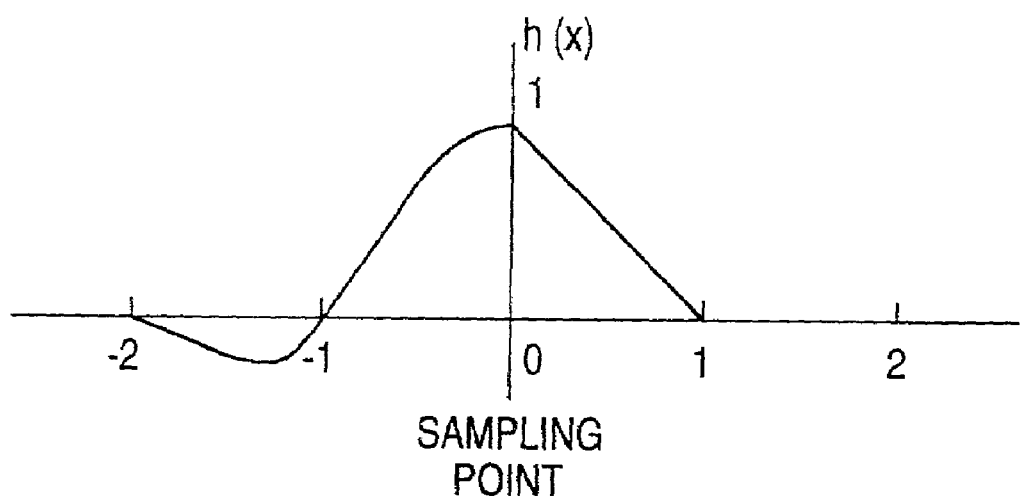
FIG. 9 is a graph showing the characteristic of another example of the interpolating function of the embodiment of the present invention.

Graphing the interpolating functions in the image processing method of the present invention indicated by (1) and (2) of the equation 5, the graphs shown in FIGS. 8 and 9 are achieved for the interpolating functions, respectively. In the equation of the former (1), the interpolating function based on the bilinear method is used for the area of x<0 and the interpolating function based on the cubic convolution method is used for the area of x≧0 while the boundary between the areas is set to x=0. Conversely, in the equation of the latter (2), the interpolating function based on the cubic convolution method is used for the area of x≦0, and the interpolating function based on the bilinear method is used for the area of x>0.

Since the interpolating function in the image processing method of the present invention satisfies h(x)=1 for x=0, the output image=the input image when the enlarging or reducing rate of the image is equal to "x1", and thus the image quality is not deteriorated.

Figure 14:
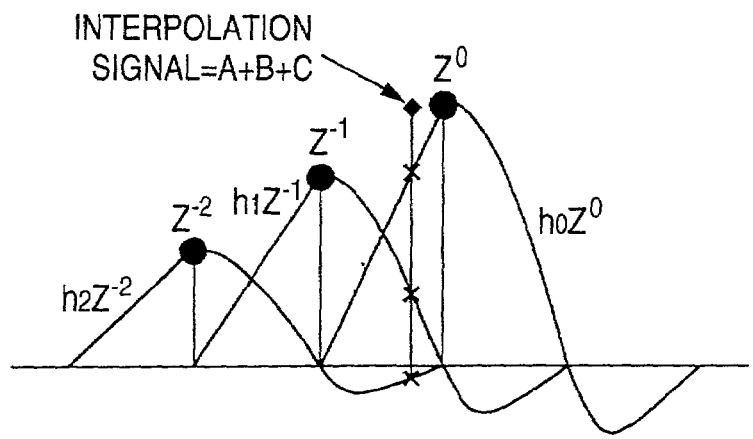
FIG. 14 is a diagram showing the principle of the calculation method based on the convolution in the interpolating method using the interpolating function shown in FIG. 8 in the embodiment of the present invention.
Figure 15:
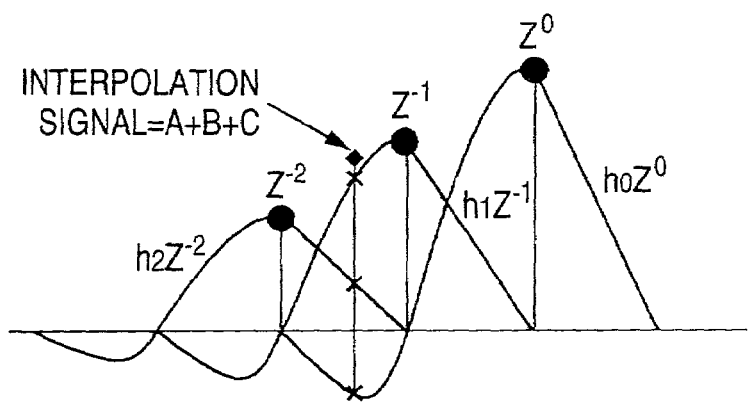
FIG. 15 is a diagram showing the principle of the calculation method based on the convolution in the interpolating method using the interpolating function shown in FIG. 9 in the embodiment of the present invention.

FIGS. 14 and 15 show an interpolation signal calculating method based on the convolution in the interpolating methods of the interpolating functions (1) and (2) shown in the equation 5. In the above interpolating methods, pixels of three adjacent points ($Z^0$, $Z^{-1}$, $Z^{-2}$) are needed for calculating the interpolation signal, and thus the interpolation signal is equal to A+B+C in FIGS. 14 and 15.

Figure 16:
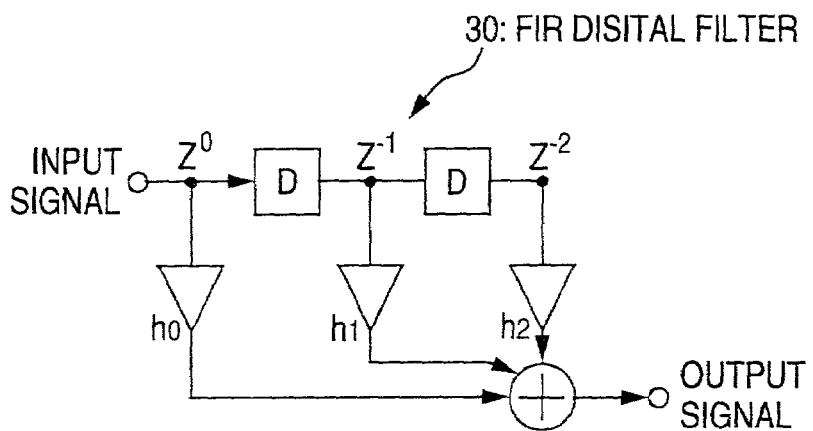
FIG. 16 is a diagram showing an FIR filter according to the embodiment of the present invention.

As shown in FIG. 16, the degree of an FIR digital filter 30 used in the interpolating method of the present invention is a second order.

Figure 17:
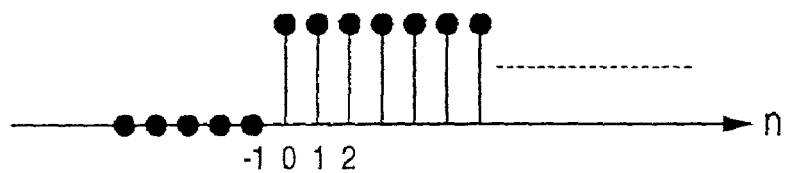
FIG. 17 shows an example of the interpolation signal in the embodiment of the present invention together with FIGS. 18 to 22, and is a diagram showing a unit step.
Figure 18:
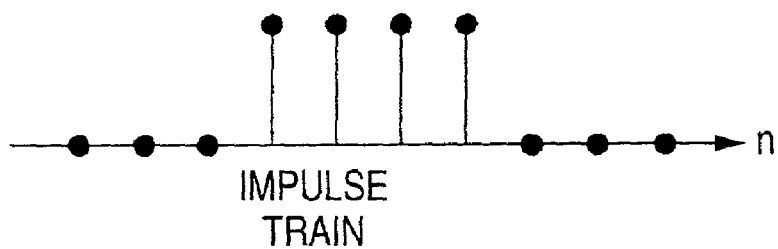
FIG. 18 is a diagram showing an impulse train.
Figure 19:
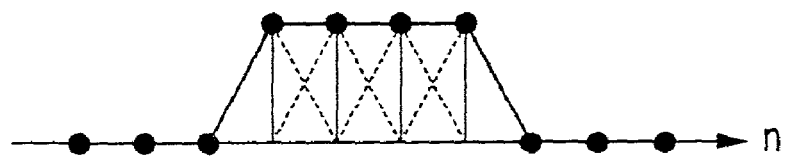
FIG. 19 is a diagram showing the response of the interpolating function based on the bilinear method.
Figure 22:
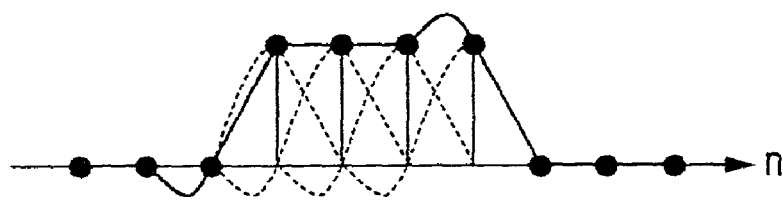
FIG. 22 is a diagram showing the response of the interpolating function shown in FIG. 9.

FIGS. 17 and 22 show an example of the interpolation signal in the image processing method of the present invention. That is, by using an impulse train shown in FIG. 18 in which a unit step shown in FIG. 17 and represented by the following equation 6 is used as an input signal, the output signal based on the bilinear interpolating method is as shown in FIG. 19.

$$\text{Unit step } U(n) = \begin{cases} 1 & (n \geq 0) \\ 0 & (n < 0) \end{cases} \quad \text{[Equation 6]}$$

Figure 20:
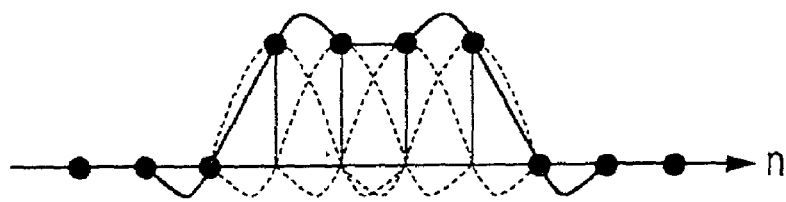
FIG. 20 is a diagram showing the response of the interpolating function based on the cubic convolution method.

On the other hand, the output interpolation signal based on the cubic convolution method is as shown in FIG. 20, and an effect of emphasizing the edge portion of the input signal is obtained.

Figure 21:
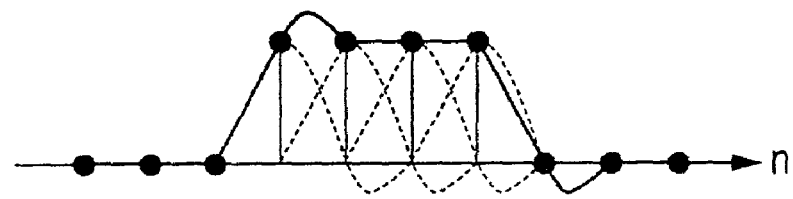
FIG. 21 is a diagram showing the response of the interpolating function shown in FIG. 8.

As shown in (1) and (2) of the equation 5 and FIGS. 21 and 22, the output interpolation signals based on the image processing method of the present invention are different in the emphasis of the appearing way of the edges thereof, however, they have a high frequency-band emphasis type characteristic which is not obtained by the bilinear interpolating method.

As described above, according to the present invention, when the image is enlarged or reduced, the function obtained by composing the tertiary function of the cubic convolution method and the triangle function of the bilinear method is used as the interpolating function to restore the inter-discrete-image signals. Therefore, when the processing is carried out by software, the algorithm is simpler and the calculation amount is smaller than the conventional image processing based on the cubic convolution method, so that the processing time is shortened. Further, when the processing is carried out by hardware, the circuit may be designed to be small and simple in scale, so that the development is easy and the cost is reduced. Likewise, as compared with the conventional image processing based on the bilinear method, the interpolating method having the high frequency-band emphasis type characteristic can be implemented, so that the edge of the image is shaper and a clearly-impressive excellent result can be achieved.

Further, the present invention is a new interpolating method used when digital images are enlarged or reduced (the resolution is changed), and thus it may be applied to all equipments having a function of changing the resolution of the digital image.

The specific shape and structure of each part shown in the above-described embodiment are examples to implement the present invention, and the subject matter of the present invention should not be limitedly interpreted by these examples.

As described above, according to the image processing method of the present invention, in order to enlarge or reduce digital images, the interpolation signals between the discrete original pixels which are used to calculate the output pixel values are calculated by the FIR digital filter using as the interpolating function the function obtained by composing the function based on the cubic convolution method and the function based on the bilinear method. Therefore, the transformed images having high image quality can be achieved regardless of the simple operation to calculate the interpolation signals and the short processing time.

According to the first aspect of the present invention, the FIR filter uses as the interpolating function a right-and-left asymmetrical function obtained by composing a part of the function based on the cubic convolution method and a part of the function based on the bilinear method. Therefore, although a transformed image having a high frequency-band emphasis type characteristic and high image quality is achieved, when the present invention is applied to a case where the image processing is carried out by software, the algorithm can be simplified, the calculation amount can be reduced and the processing time can be shortened. Further, when the present invention is applied to a case where the image processing is carried out by hardware, the circuit scale is reduced, the development is easy, and also the manufacturing cost can be reduced.

The image processing device of the present invention enlarges or reduces the digital image, and it has the FIR digital filter that uses as the interpolating function the function obtained by composing the function based on the cubic convolution method and the function based on the bilinear method for the interpolation signals between the discrete original pixels used to calculate the output pixel values. Therefore, there can be implemented an image processing device that can achieve a transformed image having high image quality regardless of a simple operation of calculating interpolating signals and a short processing time.

According to the second aspect of the present invention, the FIR filter uses as an interpolating function a right-and-left asymmetrical function obtained by composing a part of the function based on the cubic convolution method and a part of the function based on the bilinear method. Therefore, although a transformed image having a high frequency-band emphasis type characteristic and high image quality is achieved, when the present invention is applied to a device for performing the image processing by software, the algorithm can be simplified, so that the calculation amount is reduced and the processing time is short. When the present invention is applied to a device for performing the image processing by hardware, the circuit scale is reduced to make the development easy, and also the manufacturing cost can be reduced.

What is claimed is:

1. An image processing method for a digital image, characterized in that interpolation signals between discrete original pixels used for calculating an output pixel value are calculated by an FIR digital filter using as an interpolation function a function obtained by composing a function based on a cubic convolution method and a function based on a bilinear method, wherein said FIR filter uses as an interpolation function a function that is obtained by composing a part of the function based on the cubic convolution method and a part of the function based on the bilinear method and is asymmetric with respect to the right and left, wherein the cubic convolution method is used for an area of $x \leq 0$, and the bilinear method is used for an area of $x > 0$.

2. An image processing device for a digital image, characterized by comprising an FIR digital filter using as an interpolation function a function obtained by composing a function based on a cubic convolution method and a function based on a bilinear method for an interpolation signal between discrete original pixels used for calculating an output pixel value, wherein said FIR filter uses as an interpolation function a function that is obtained by composing a part of the function based on the cubic convolution method and a part of the function based on the bilinear method and is asymmetric with respect to the right and left, wherein the cubic convolution method is used for an area of $x \leq 0$, and the bilinear method is used for an area of $x > 0$.

3. The image processing method as claimed in claim 1 is for enlarging or reducing the digital image.

4. The image processing device as claimed in claim 2 is for enlarging or reducing the digital image.

5. An electronics apparatus for a digital image, characterized by comprising an FIR digital filter using as a function a right-and-left asymmetrical interpolating function obtained by composing a function based on a part of a cubic convolution method and a part of a bilinear method for an interpolation signal between discrete original pixels used for calculating an output pixel value, wherein the cubic convolution method is used for an area of $x \leq 0$, and the bilinear method is used for an area of $x > 0$.

6. The electronics apparatus as claimed in claim 5 is for enlarging or reducing the digital image.

7. The image processing method as claimed in claim 1, wherein the degree of said FIR is a second order.

8. An image processing method for a digital image, characterized in that interpolation signals between discrete original pixels used for calculating an output pixel value are calculated by an FIR digital filter using as an interpolation function a function obtained by composing a function based on a cubic convolution method and a function based on a bilinear method, wherein said FIR filter uses as an interpolation function a function that is obtained by composing a part of the function based on the cubic convolution method and a part of the function based on the bilinear method and is asymmetric with respect to the right and left, wherein the bilinear method is used for a left area of $x<0$ and the cubic convolution method is used for a right area of $x \geqq 0$.

9. The image processing method as claimed in claim 8, wherein a boundary between said left and right areas is set to $x=0$.

10. The image processing device as claimed in claim 2, wherein the degree of said FIR is a second order.

11. An image processing device for a digital image, characterized by comprising an FIR digital filter using as an interpolation function a function obtained by composing a function based on a cubic convolution method and a function based on a bilinear method for an interpolation signal between discrete original pixels used for calculating an output pixel value, wherein said FIR filter uses as an interpolation function a function that is obtained by composing a part of the function based on the cubic convolution method and a part of the function based on the bilinear method and is asymmetric with respect to the right and left, wherein the bilinear method is used for a left area of $x<0$ and the cubic convolution method is used for a right area of $x \geqq 0$.

12. The image processing device as claimed in claim 11, wherein a boundary between said left and right areas is set to $x=0$.

13. The electronics apparatus as claimed in claim 5, wherein the degree of said FIR is a second order.

14. An electronics apparatus for a digital image, characterized by comprising an FIR digital filter using as a function a right-and-left asymmetrical interpolating function obtained by composing a function based on a part of a cubic convolution method and a part of a bilinear method for an interpolation signal between discrete original pixels for calculating an output pixel, wherein the bilinear method is used for a left area of $x<0$ and the cubic convolution method is used for a right area of $x \geqq 0$.

15. The electronics apparatus as claimed in claim 14, wherein a boundary between said left and right areas is set to $x=0$.

16. The image processing method as claimed in claim 8 is for enlarging or reducing the digital image.

17. The image processing method as claimed in claim 8, wherein the degree of said FIR is a second order.

18. The image processing device as claimed in claim 11 is for enlarging or reducing the digital image.

19. The image processing device as claimed in claim 11, wherein the degree of said FIR is a second order.

20. The electronics apparatus as claimed in claim 14 is for enlarging or reducing the digital image.

21. The electronics apparatus as claimed in claim 14, wherein the degree of said FIR is a second order.

* * * * *